(12) United States Patent
Sugaya et al.

(10) Patent No.: US 6,728,231 B1
(45) Date of Patent: Apr. 27, 2004

(54) RADIO TRANSMISSION METHOD AND RADIO TRANSMISSION

(75) Inventors: Shigeru Sugaya, Kanagawa (JP); Takanobu Kamo, Kanagawa (JP); Hidemasa Yoshida, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/533,082

(22) Filed: Mar. 22, 2000

(30) Foreign Application Priority Data

Mar. 24, 1999 (JP) .......................................... 11-080100

(51) Int. Cl.$^7$ ................................................. H04J 3/00
(52) U.S. Cl. ........................................ 370/336; 455/507
(58) Field of Search .............................. 370/336, 337, 370/338, 340, 341, 342, 347, 348, 442, 443, 444, 458, 459, 462; 455/507, 509, 516, 517, 524, 525; 340/825.08, 825.44

(56) References Cited

U.S. PATENT DOCUMENTS

| | | | |
|---|---|---|---|
| 4,549,293 A | | 10/1985 | Christian et al. |
| 4,754,453 A | * | 6/1988 | Eizenhofer .................. 370/337 |
| 4,949,336 A | * | 8/1990 | Hamada ...................... 370/460 |
| 5,133,080 A | | 7/1992 | Borras |
| 5,446,739 A | * | 8/1995 | Nakano ...................... 370/95.3 |
| 5,553,076 A | | 9/1996 | Behtash et al. |
| 5,612,948 A | | 3/1997 | Fette et al. |
| 5,850,593 A | * | 12/1998 | Uratani ....................... 370/321 |
| 5,982,765 A | * | 11/1999 | Shimada ..................... 370/347 |
| 6,490,459 B1 | * | 12/2002 | Sugaya ....................... 455/517 |
| 6,493,545 B1 | * | 12/2002 | Sugaya ....................... 455/272 |
| 6,502,155 B1 | * | 12/2002 | Kondo ........................ 455/403 |
| 6,542,494 B1 | * | 4/2003 | Sugaya ....................... 370/345 |
| 6,567,386 B1 | * | 5/2003 | Sugaya ....................... 370/322 |

FOREIGN PATENT DOCUMENTS

WO 0042737 7/2000 ........... H04L/12/28

OTHER PUBLICATIONS

IBM Corp., IBM Technical Disclosure Bulletin, *Packet Relay System for Wireless LAN*, vol. 39 No. 02 Feb. 1996.

* cited by examiner

Primary Examiner—Douglas Olms
Assistant Examiner—Ricardo M. Pizarro
(74) Attorney, Agent, or Firm—Jay H. Maioli

(57) ABSTRACT

A method for allowing a communication station to newly join an existing radio network constituted of plural units of communication stations includes a radio transmission a method for carrying out radio transmission in a radio network formed of plural communication stations by a control signal from a communication station set up as a central control station, including the steps of: specifying a frame cycle of a radio transmission signal by a control of the centrat control station; setting a predetermined position in the specified frame cycle as a slot for newly joining the radio network; and if a predetermined signal is transmitted through the slot, carrying out a processing for allowing a transmission source of the signal to join the radio network.

8 Claims, 11 Drawing Sheets

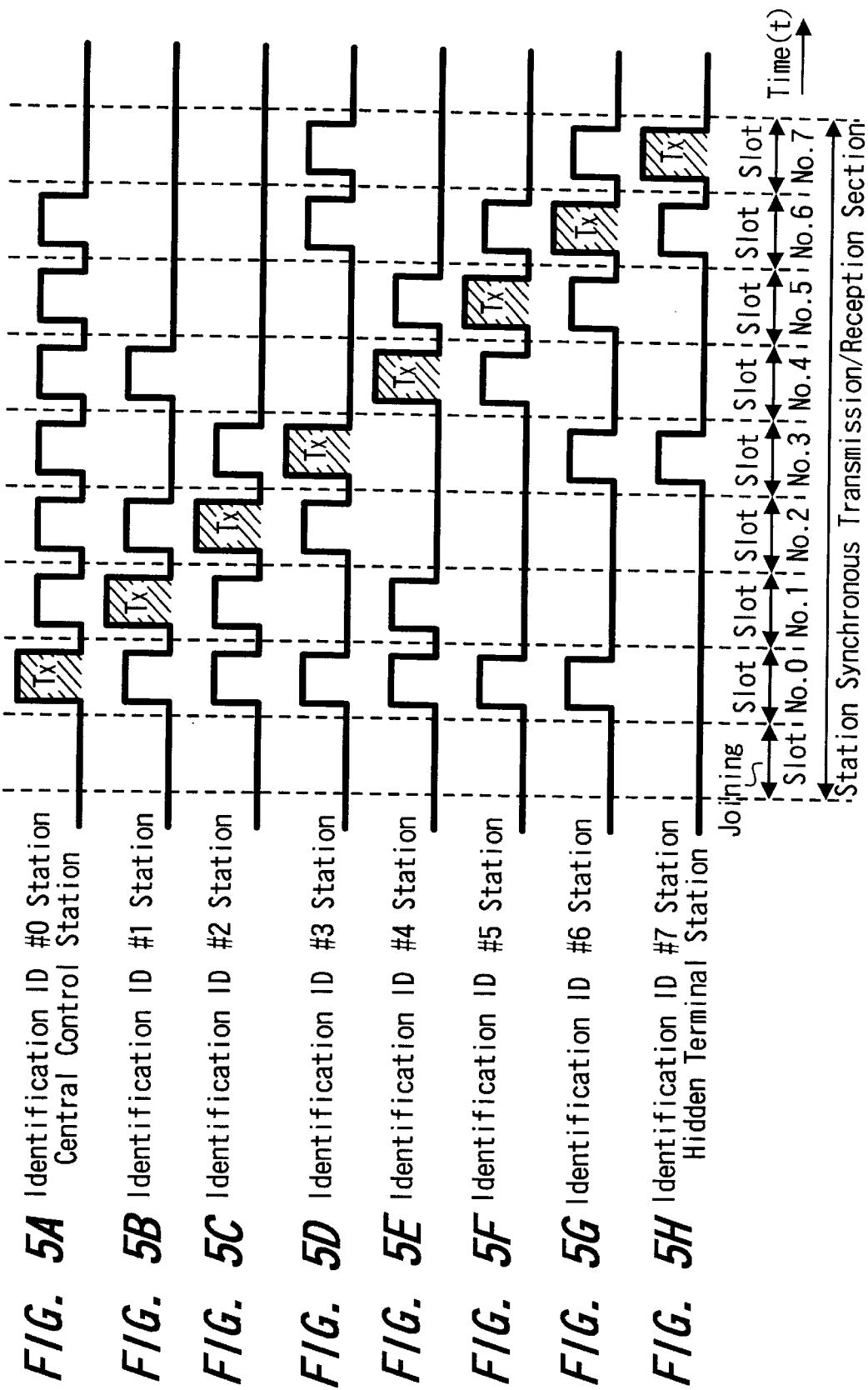

Station Synchronous Transmission (#0)

Station Synchronous Transmission (#1)

Station Synchronous Transmission (#2)

Station Synchronous Transmission (#3)

Station Synchronous Transmission (#4)

Station Synchronous Transmission (#5)

Station Synchronous Transmission (#6)

Station Synchronous Transmission (#7)

Transmission
Through A Newly
Joining Slot

Station Joining Without
Identification ID

Transfer of Certification
Information By Control
Station

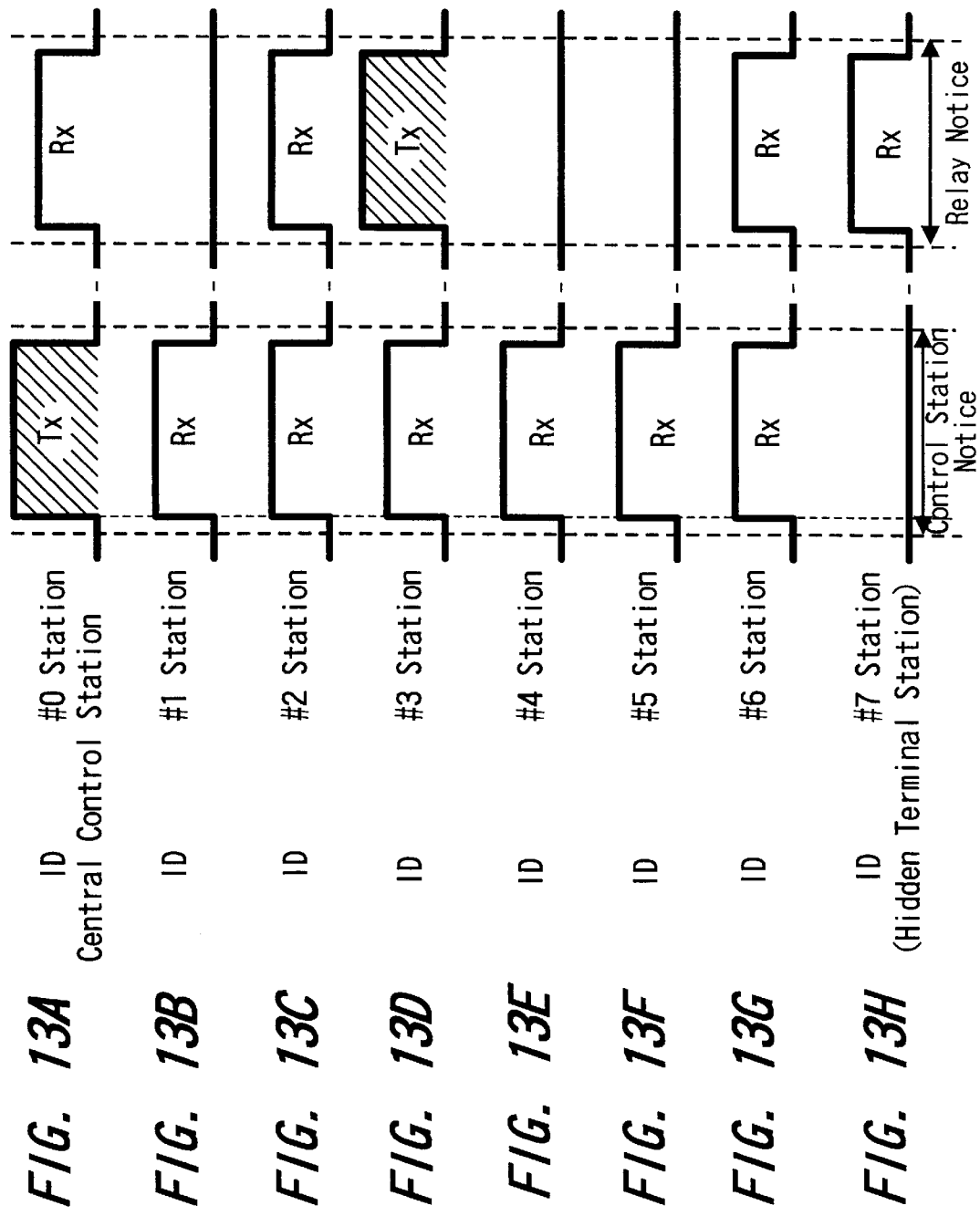

Broadcasting of Control
Station Notice
(Management Information

Resending of Control
Station Notice by
Parent Station

RADIO TRANSMISSION METHOD AND RADIO TRANSMISSION

BACKGROUND OF THE INVENTION

1. Field of the Invention

The present invention relates to a radio transmission method to be preferably applied to building up of local area network (LAN) among multiple appliances by transmitting various information by means of radio signals and a radio transmission apparatus to which the same radio transmission method is applied.

2. Description of the Related Art

Conventionally, when a local area network is built up among plural appliances like various video appliances or personal computer and their peripherals in a relatively small area such as home and office so as to transmit data handled among them, radio transmission method has been sometimes used by attaching a radio signal transmitting/reception device to respective appliances instead of connecting a signal line directly among those appliances.

By building up a local area network by radio transmission, the necessity of connecting respective appliances directly with a signal line is eliminated, thereby simplifying a system configuration.

However, if signals are transmitted from plural transmitters when a local area network is built through the plural radio transmitters, there is a possibility that a transmission error may occur. Thus, it is necessary to access-control communication among the respective transmitters in the network according to some method.

As a conventionally well known access control method in a small size radio network, there is a method of controlling communications among respective transmitters (terminal stations: nodes) in the network in a unified way with a central transmitter (central control station: route node) in a star type connection. For example, communication in the network is controlled by polling control. According to this method, the central control station in the network transmits a control signal for polling to the other nodes in the network successively so that transmission from each node is carried out in order according to the polling. By transmission processing by the polling, transmission efficiency can be improved.

Meanwhile, in a network system like such a star type connection, it is absolutely necessary for all communication stations in the network to be capable of communicating with the central control station directly by radio. Further, a communication station incapable of communicating with the central control station directly can be made to function as a terminal station (so-called hidden terminal station) by making other particular terminal station relay a control signal from the central control station to that terminal station.

However, if the number of the communication stations constituting a network is predetermined or all communication stations to be used in the network are prepared preliminarily when such a radio network is built up, identification ID inherent of this radio network or terminal ID inherent of each communication station can be determined when a transmitter for constituting each communication station is manufactured or the network is built up. In this case, the radio network may be built up relatively easily.

If a new communication station is intended to join an existing radio network, it is necessary to set up a communication network identification ID or terminal ID on that new communication station. As a result, it takes much labor and time for the setup, so that a new communication station cannot be added so easily. Further, in addition to setup of the ID on the communication station intended to join newly, the central control station for managing the network must carry out a processing for recognizing an existence of that new communication station. Thus, this is another reason that the communication station cannot be added so easily.

SUMMARY OF THE INVENTION

Accordingly, an object of the present invention is to provide a method for allowing a communication station intended to join an existing radio network newly to join it easily.

To achieve the above object, according to an aspect of the present invention, there is provided a radio transmission method for carrying out radio transmission in a radio network comprised of plural communication stations by a control from a communication station set up as a central control station, comprising the steps of: specifying a frame cycle of radio transmission signal by a control of the central control station;

setting a predetermined position in the specified frame cycle as a slot for joining the radio network newly; and if a predetermined signal is transmitted through the slot, carrying out a processing for allowing a transmission source of the signal to join the radio network.

According to this radio transmission method, if a communication station intended to join the radio network newly synchronizes with a frame cycle set up therein by the central control station and sends a predetermined signal at a slot position for newly joining in that frame cycle, the central control station recognizes that signal and executes a processing for allowing that communication station to join the network newly.

According to another aspect of the present invention, there is provided a radio transmission apparatus for carrying out radio communication with other communication stations in a radio network, comprising: a communication processing means for transmitting and receiving a radio signal; and a control means for transmitting a signal for specifying a frame cycle with the communication processing means and when reception of the specific signal is recognized at a predetermined slot position in the frame cycle, carrying out a processing for making a transmission source of the specific signal join the radio network.

According to this radio transmission apparatus, when reception of a specific signal is recognized in the predetermined slot position, a processing for making a transmission source of the specific signal join the radio network is carried out, so that the newly joining of the radio terminal into the network is carried out under a control of this radio transmission apparatus.

BRIEF DESCRIPTION OF THE DRAWINGS

FIG. 5 is an explanatory diagram showing transmission state in management area at each node according to an embodiment of the present invention;

FIG. 13 is a timing chart showing an example of processing for resending operation of management information according to an embodiment of the present invention.

DETAILED DESCRIPTION OF THE PREFERRED EMBODIMENTS

Hereinafter, the preferred embodiments of the present invention will be described in detail with reference to the accompanying drawings.

Figure 1:
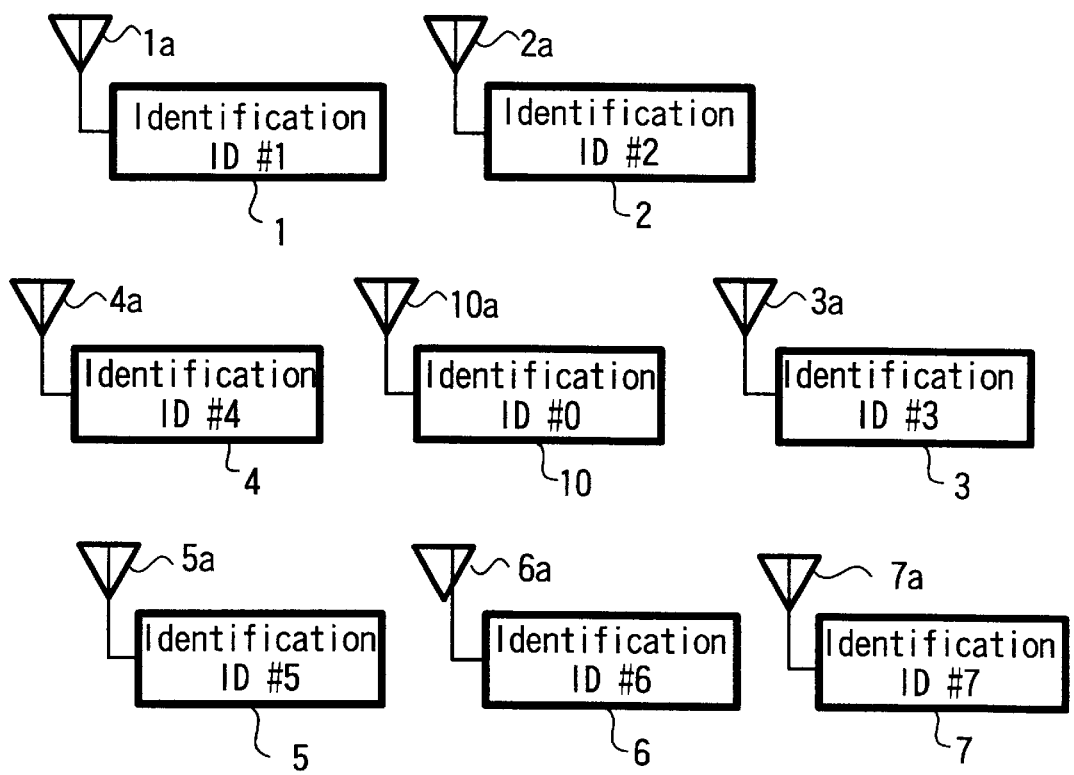
FIG. 1 is an explanatory diagram showing an example of network setting according to an embodiment of the present invention.

This example is a network system constructed as a system for transmitting and receiving video data, audio data and computer data in a relatively small office and home. A structure of this system will be described with reference to FIG. 1. In the network system of this example, a maximum number of radio transmission apparatus is determined preliminarily, and for example, the network is constructed with 16 units of the radio transmission apparatuses max. FIG. 1 shows a state in which eight radio transmission apparatuses 1–7, 10 are located. Antennas 1a–7a, 10a for carrying out transmission and reception are connected to each of the radio transmission apparatuses 1–7, 10. Video signal reproduction unit, monitor unit, computer unit, printer unit and other processing units (not shown) are connected to the respective radio transmission apparatuses 1–7, 10. Data transmission is carried out via a connected radio transmission apparatus if the data transmission is required between these processing units.

Eight radio transmission apparatuses 1–7, 10 function as a node which is a radio communication station and have individual identification ID for identifying each apparatus. That is, the transmission apparatus 10 has #0 as its identification ID and the transmission apparatuses 1–7 have #1–#7 as the identification ID.

In this case, a radio transmission apparatus in the network system is set as a route node which functions as a central control station and radio communication between respective nodes is carried out by polling control from this control station. Basically, this control station is preferred to use a radio transmission apparatus disposed at a position enabling to carry out radio communication directly to all other stations in the system. In this case, the radio transmission apparatus 10 having the identification ID#0 disposed substantially in the center of the network system is used as the central control station so that peripheral other stations are controlled by this central route node according to so-called star type connecting structure. Meanwhile, when in the following description, just a communication station is mentioned, it includes the central control station.

In this example, the radio transmission apparatus 7 having the identification ID#7 is disposed at a position where it cannot communicate directly with the radio transmission apparatus 10 which is the control station. However, the radio transmission apparatus 7 is disposed at a position where it is capable of communicating directly with the radio transmission apparatus 3 having the identification ID#3 and the radio transmission apparatus 6 having the identification ID#6.

Figure 2:
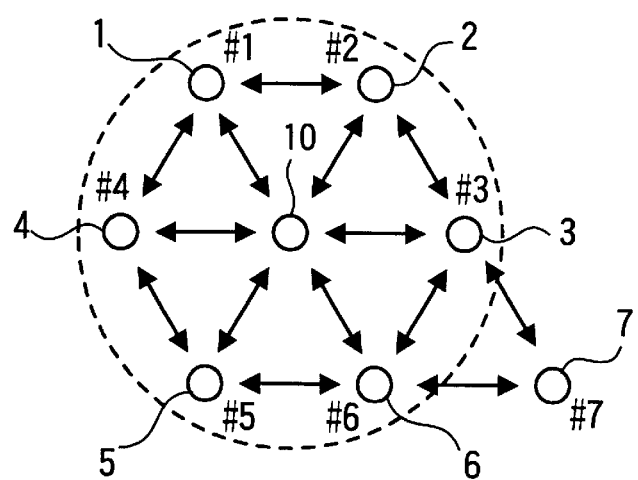
FIG. 2 is an explanatory diagram showing an example of topology map according to an embodiment of the present invention.

FIG. 2 is a diagram showing a physical topology map showing communication between respective stations in the disposition of the respective stations and control station of this example. An arrow indicates that direct communication is enabled between stations indicated by that arrow. Area a indicated by dashed line of FIG. 2 is an area in which direct communication with communication station 10 which is a route node is enabled. In this example, basically, the respective communication stations 1–7, 10 can communicate with only stations in the neighborhood. For example, the communication stations 1 having the identification ID#1 can communicate with the communication stations 2, 4, 10 having the identification ID#2, #4, #10 disposed around the communication stations 1. This is the same for the other communication stations and the communication station (control station) 10 disposed substantially in the center can communicate with all other communication stations 1–6 except the communication station 7 having the identification ID#7 directly. To communicate between communication stations which cannot communicate with each other directly, other communication station carries out processing for relaying transmission data. To communicate with the communication station (hidden terminal station) 7 which the central control station cannot communicate directly, specified relay stations (terminal station 3 or 6) for the terminal station 7 relays control information from the central control station to the communication station 7. A processing for selecting this relay station will be described later.

Figure 3:
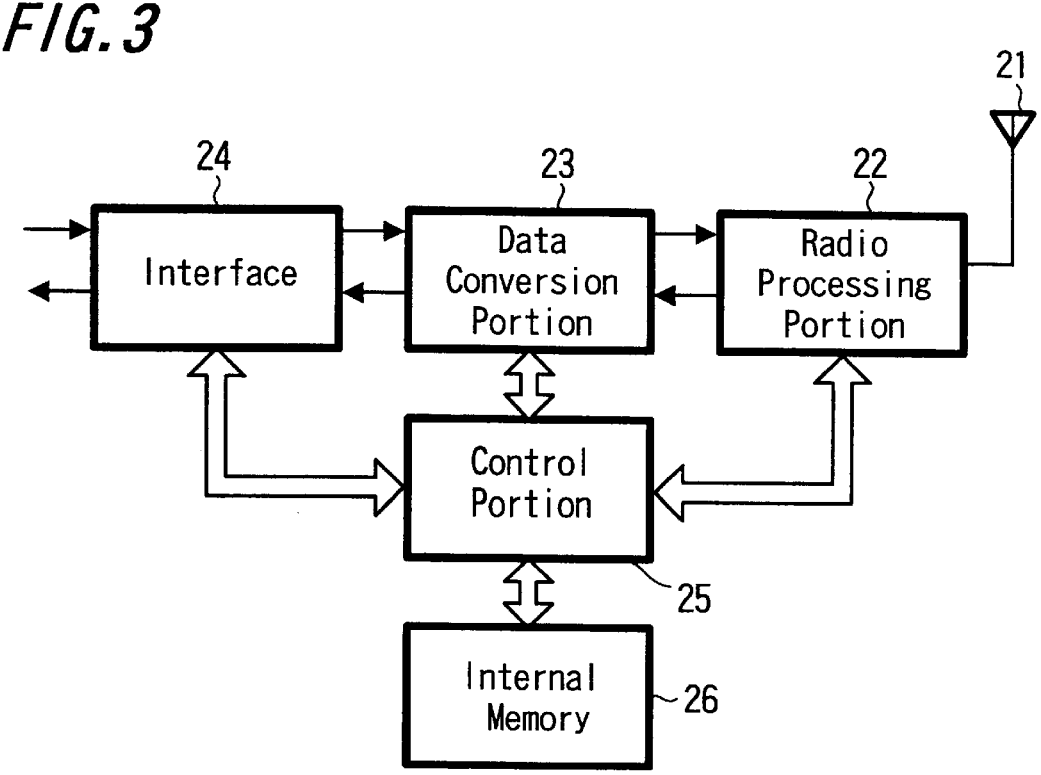
FIG. 3 is a block diagram showing a structure of radio transmission apparatus according to an embodiment of the present invention.

FIG. 3 shows an example of structure of the radio transmission apparatuses 1–7, 10 constituting each communication station. The respective radio transmission apparatuses 1–7, 10 have basically the same configuration (only control system for making function as a central control station is different from other communication stations). Each of the radio transmission apparatus includes an antenna 21 for carrying out transmission and reception and a radio processing portion 22 which is connected to the antenna 21 for carrying out transmission processing and reception processing for radio signal. In this case, as transmission system for carrying out transmission and reception in the radio processing portion 22, for example, transmission system with multi-carrier signal called OFDM (orthogonal frequency division multiplex) is employed and as a frequency for use in transmission and reception, for example, a very high frequency band (for example, 5 Ghz band) is used. In this example, a relatively low output is set up as a transmission output so that when used indoor, this output enables radio transmission over a relatively short distance of several meters to several tens of meters.

Then, a data conversion portion 23 for converting data received by the radio processing portion 22 or to be transmitted by the radio processing portion 22 is provided. Data converted by this data conversion portion 23 is supplied to a processing unit through an interface portion 24 and data supplied from the connected processing unit is supplied to the data conversion portion 23 through the interface portion 24 so that the data is converted. When the interface portion 24 is connected to an external unit, for example, bus line specified as IEEE1394 standard is used. If this bus line is provided, a power supply line as well as a signal line for transmitting data and clock is provided depending on the cases.

Respective components in the radio transmission apparatus are so constructed that processing is carried out by a control of the control portion 25 constituted of microcomputer and the like. In this case, if a signal received by the radio processing portion 22 is a control signal, that received control signal is supplied to the control portion 25 through the data conversion portion 23. Then, the control portion 25 sets up respective components in a state indicated by that received control signal. As for a control signal to be transmitted from the control portion 25 to other transmission apparatus, the control signal is supplied from the control portion 25 to the radio processing portion 22 through the data conversion portion 23, so that the data is transmitted. If a received signal is synchronous signal, the control portion 25 determines a reception timing of the synchronous signal and sets up a frame frequency based on the synchronous signal and carries out transmission control processing with that frame frequency. Further, an internal memory 26 is connected to the control portion 25 and the internal memory 26 memorizes data necessary for transmission control temporarily.

Figure 4:
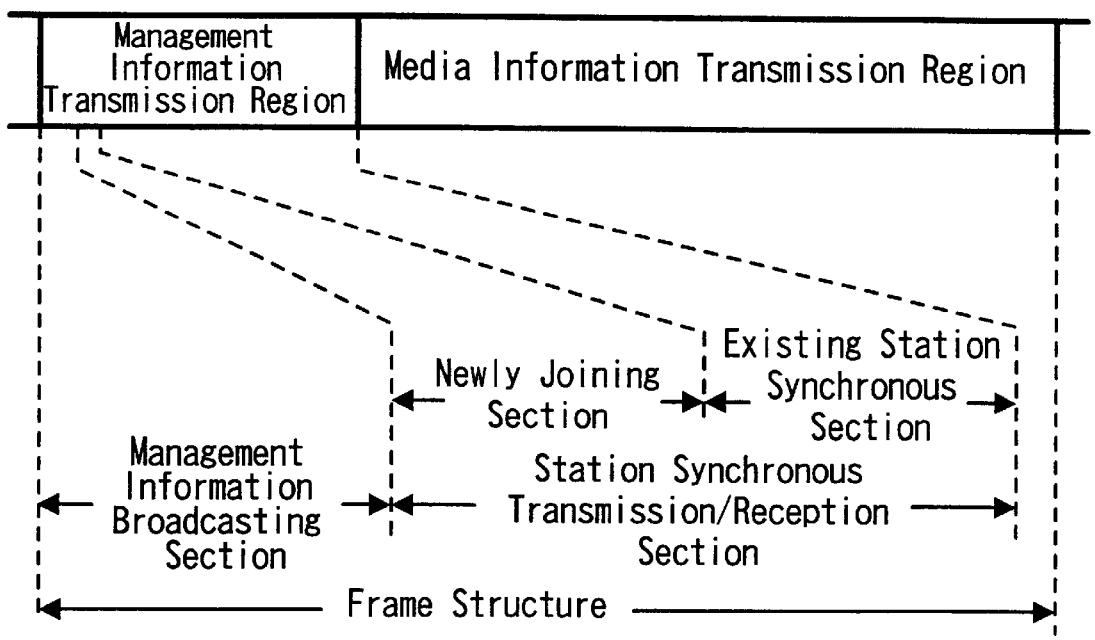
FIG. 4 is an explanatory diagram showing an example of frame structure, according to an embodiment of the present invention.

FIG. 4 shows a configuration of signals transmitted between communication stations (radio transmission apparatuses 1–7, 10) in a network system of this example. In this example, the frame frequency is determined to transmit data. That is, as shown in FIG. 4, a frame interval is specified with a predetermined interval. A predetermined section of a head portion of that frame interval is specified as management information transmission region and then, management information broadcasting section and station synchronous transmission/reception section are set in this management information transmission region. The station synchronous transmission/reception section is composed of newly joining section and existing station synchronous section. A section other than the management information transmission region of each frame is specified as media information transmission region and various data is transmitted by polling control in this media information transmission region.

In the management information broadcasting section, management information common to system is transmitted from the central control station 10. As this management information, for example, synchronous data necessary for attaining frame synchronism in the network system, identification number data inherent of the network system, topology map data in the network and the like are transmitted.

In the existing station synchronous section of the station synchronous transmission/reception section of a frame, a predetermined number of slots (16 in this case) are set up with an equal interval and 16 slots in this frame are allocated to each of 16 communication stations in this network system. As for allocation of the slot, from a head slot successively, identification ID #0 communication station slot, identification ID#1 communicates slot, . . . identification ID#15 communication station slot are specified. In a slot allocated for each communication station, a communication station corresponding to that slot transmits a station synchronous signal. Because the network system is comprised of eight communication stations in this example, eight slots are used (eight slots from the head) and the remaining slots are not used (that is, no data is transmitted thereto). The station synchronous signal includes for example, identification ID data to be attached to each communication station and data about communication stations which that station can receive (data generated based on a reception state of station synchronous signal before a frame). As the newly joining section of the station synchronous transmission/ reception section of a frame, a slot interval just before the existing station synchronous section is prepared. Therefore, the station synchronous transmission/reception section in a frame is composed of newly joining section of a slot and existing station synchronous section of 16 slots, totaling 17 slots.

The station synchronous signal transmitted by each slot in the station synchronous transmission/reception section is received by each communication station in the network system. The transmission processing and reception processing of the station synchronous signal will be described later.

In the media information transmission region, data transmission processing between communication stations is carried out based on access control of the central control station. This access control from the central control station 10 is carried out by polling control from the central control station 10. In this polling control processing, each communication station is called successively from the central control station 10 according to polling response request signal and then, transmission is carried out in succession for each communication station.

If a communication station of identification ID specified by the polling response request signal has data to be transmitted, it carries out data transmission processing just after it receives that polling response request signal.

As data transmission in the media information transmission region, instead of this polling transmission, it is permissible to divide media information transmission region of a frame into plural slots preliminarily and then, allocate the divided slots to communication stations sending transmission request by control of the central control station.

As for transmission processing at this time, it can be considered that either data transmission by asynchronous transmission mode or data transmission by isochronous transmission mode will be used depending on type of data to be transmitted. The asynchronous transmission mode is used for transmission of a relatively short data such as control data and isochronous transmission mode is used for transmission of data requiring real-time transmission such as video data and audio transmission mode is prepared, for example, a system specified as IEEE1394 can be applied.

When the asynchronous transmission mode is selected, it is preferable to transmit by polling control. When the isochronous transmission mode is selected, it is preferable to transmit by allocation according to the slot allocation.

Next, transmission processing and reception processing of the station synchronous signal will be described with reference to FIG. 5. Although as described above, 16 slots are prepared in the existing station synchronous section of the station synchronous transmission/reception section, it is assumed that eight slots from 0 slot to 7 slot are prepared to simplify the description and that respective slots are allocated to communication station 10, 1–7.

A–H of FIG. 5 indicates communication in the station synchronous transmission/reception section of the eight communication stations. A of FIG. 5 indicates a state of communication station 10 which is the central control station. B–H of FIG. 5 indicates a state of communication stations 1–7 in order. In FIG. 5, a shaded portion indicates a state in which transmission processing Tx is carried out in the radio processing portion 22 which is a transmitting means of that communication station and radio transmission is carried out through the antenna 21. Other rising section like a pulse indicates a state in which a signal sent from other communication station is received appropriately by the radio processing portion 22 of other communication station. A section not rising like a pulse indicates a state in which such a signal cannot be received properly (although received, data cannot be decoded properly).

Because eight communication stations are set up as communication stations in radio network whose communication is controlled by the central control station 10 in this example, as shown in FIGS. 5 A–H no signal is transmitted in the newly joining section slot in the station synchronous transmission/reception section of a frame.

Figure 6A:
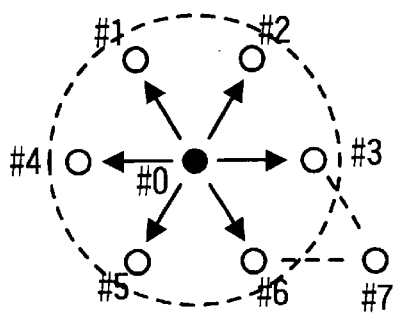
FIG. 6 is an explanatory diagram showing an example of transmission/reception operation in synchronous transmission and reception between stations according to an embodiment of the present invention.

In the existing station synchronous section, as shown in FIG. 5A, the transmission processing Tx of the station synchronous signal is carried out in 0 slot section by the communication station 10 of the identification ID#0 which is the central control station. In the other slots (section after the first slot), reception processing is carried out. In reception up to the sixth slot, communication stations 1–6 allocated to those slots are at a position which enables direct radio communication with the communication station 10. Therefore, data contained in each reception signal can be decoded properly. Conversely, in the seventh slot section, the communication station 7 is not at a position which it is capable of communicating directly with the communication station 10. Thus, at this slot position, data cannot be received. FIG. 6A shows transmission state of the station synchronous signal transmitted from the communication station 10 to the 0 slot. The communication stations 1–6 of identification ID#1–6 are located within a range which a signal sent from the communication station 10 can reach. Although the station synchronous signal from the communication station 10 is received by the communication stations 1–6 properly, the communication station 7 of the identification #7 located far away cannot receive the station synchronous signal from the communication station 10.

Figure 6B:
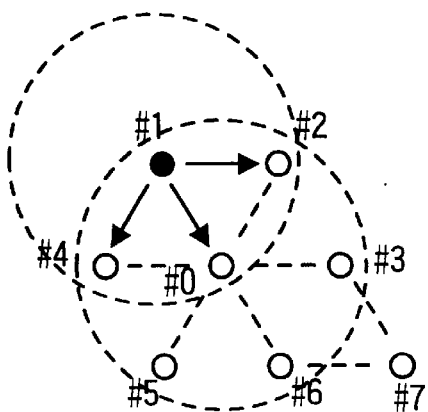

In the communication stations 1–7 of the identification ID#1 #7, as shown in FIGS. 5 B–H, a station synchronous signal is transmitted at a slot position allocated for each communication station and reception processing is carried out at the other slot positions. That is, the communication station 1 of the identification ID#1 carries out transmission processing Tx of node synchronous signal in the first slot as shown in FIG. 5B and reception processing in the other slots. At this time, communication stations 10, 2, 4 having the identification ID#0, #2, #4 are located adjacent the communication station 1 of the identification ID#1 and the communication station 1 can receive only node synchronous signal sent to the 0 slot, second slot and fourth slot properly as shown in FIG. 5B. FIG. 6B shows a transmission state of the station synchronous signal sent from the communication station 1 to the first slot. The communication stations 10, 2, 4 of the identification ID#0, #2, #4 are located in a range which a signal sent from the communication station 1 reaches and the station synchronous signal from the communication station 1 is received properly by the communication stations 2, 4, 10.

Figure 6C:
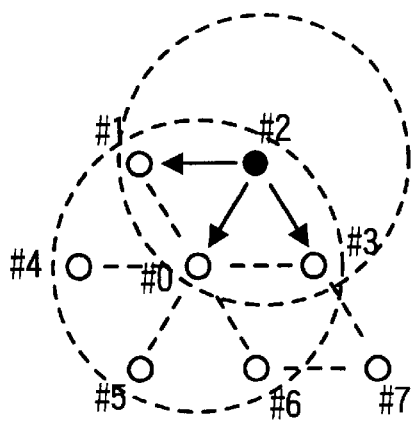

As shown in FIG. 5C, the communication station 2 of the identification ID#2 carries out transmission processing Tx of the station synchronous signal at the second slot and reception processing at the other slots. At this time, the communication stations 10, 1, 3 of the identification ID#0, #1, #3 are located adjacent the communication station 2. As shown in FIG. 5C, the communication station 2 can receive only the station synchronous signal sent from these communication stations to the 0 slot, first slot and third slot properly. FIG. 6C shows transmission of the station synchronous signal sent from the communication station 2 to the second slot. The communication stations 10, 1, 3 of the identification ID#0, #1, #3 are located in a range which a signal sent from the communication station 2 reaches, so that the station synchronous signal sent from the communication station 2 is received by the communication stations 10, 1, 3 of the identification ID#0, #1, #3 properly.

Figure 6D:
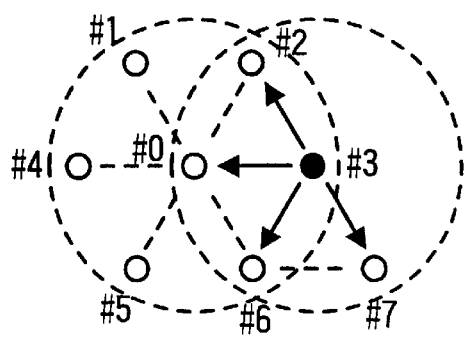

As shown in FIG. 5D, the communication station 3 of the identification ID#3 carries out transmission processing Tx of the station synchronous signal at the third slot and reception processing at the other slots. At this time, the communication stations 10, 2, 6, 7 of the identification ID#0, #2, #6, #7 are located adjacent the communication station 3. As shown in FIG. 5D, the communication station 3 can receive only the station synchronous signal from these communication stations to the 0 slot, second slot, sixth slot and seventh slot properly. FIG. 6D shows transmission of the station synchronous signal sent from the communication station 3 to the third slot. The communication stations 10, 2, 6, 7 of the identification ID#0, #2, #6, #7 are located in a range which a signal sent from the communication station 3 reaches, so that the station synchronous signal sent from the communication station 3 is received by the communication stations 10, 2, 6, 7 of the identification ID#0, #2, #6, #7 properly.

Figure 6E:
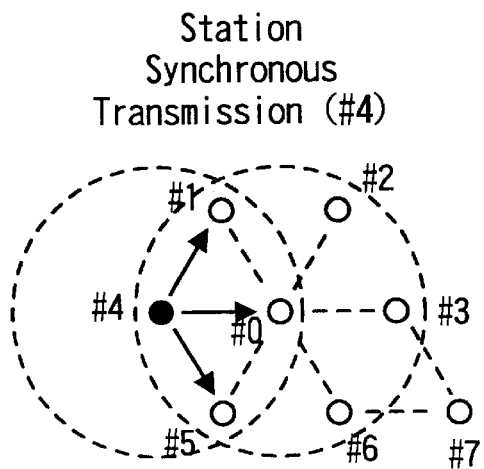

As shown in FIG. 5E, the communication station 4 of the identification #4 carries out transmission processing Tx of the station synchronous signal at the fourth slot and reception processing at the other slots. At this time, the communication stations 10, 1, 5 of the identification ID#0, #1, #5 are located adjacent the communication station 4. As shown in FIG. 5E, the communication station 4 can receive only the station synchronous signal from these communication stations to the 0 slot, first slot and fifth slot properly. FIG. 6E shows transmission of the station synchronous signal sent from the communication station 4 to the fourth slot. The communication stations 10, 1, 5 of the identification ID#0, #1, #5 are located in a range which a signal sent from the communication station 4 reaches, so that the station synchronous signal sent from the communication station 4 is received by the communication stations 10, 1, 5 of the identification ID#0, #1, #5 properly.

Figure 6F:
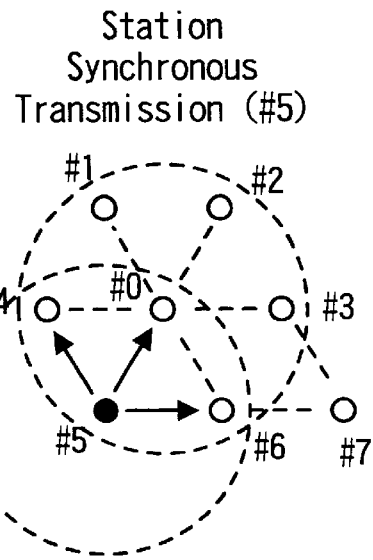

As shown in FIG. 5F, the communication station 5 of the identification ID#5 carries out transmission processing Tx of the station synchronous signal at the fifth slot and reception processing at the other slots. At this time, the communication stations 10, 4, 6 of the identification ID#0, #4, #6 are located adjacent the communication station 5. As shown in FIG. 5F, the communication station 5 can receive only the station synchronous signal from these communication stations to the 0 slot, fourth slot, and sixth slot properly. FIG. 6F shows transmission of the station synchronous signal sent from the communication station 5 to the fifth slot. The communication stations 10, 4, 6 of the identification ID#0, #4, #6 are located in a range which a signal sent from the communication station 5 reaches, so that the station synchronous signal sent from the communication station 5 is received by the communication stations 10, 4, 6 of the identification ID#0, #4, #6 properly.

Figure 6G:
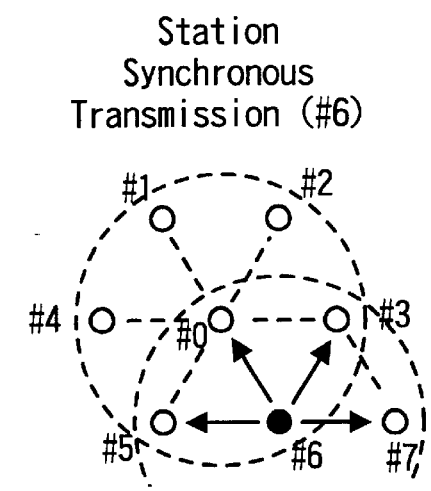

As shown in FIG. 5G, the communication station 6 of the identification ID#6 carries out transmission processing Tx of the station synchronous signal at the sixth slot and reception processing at the other slots. At this time, the communication stations 10, 3, 5, 7 of the identification ID#0, #3, #5, #7 are located adjacent the communication station 6. As shown in FIG. 5G, the communication station 6 can receive only the station synchronous signal from these communication stations to the 0 slot, third slot, fifth slot and seventh slot properly. FIG. 6G shows transmission of the station synchronous signal sent from the communication station 6 to the sixth slot. The communication stations 10, 3, 5, 7 of the identification ID#0, #3, #5, #7 are located in a range which a signal sent from the communication station 6 reaches, so that the station synchronous signal sent from the communication station 6 is received by the communication stations 10, 3, 5, 7 of the identification ID#0, #3, #5, #7 properly.

Figure 6H:
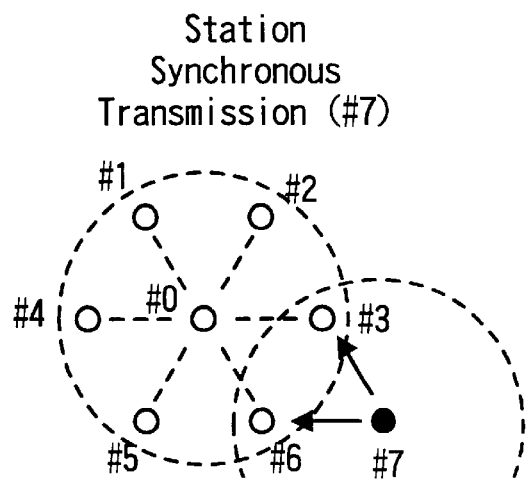

As shown in FIG. 5H, the communication station 7 of the identification ID#7 carries out transmission processing Tx of the station synchronous signal at the sixth slot and reception processing at the other slots. At this time, the communication stations 3, 6 of the identification ID#3, #6 are located adjacent the communication station 7. As shown in FIG. 5H, the communication station 7 can receive only the station synchronous signal from these communication stations to the third slot and sixth slot properly. FIG. 6H shows transmission of the station synchronous signal sent from the communication station 7 to the seventh slot. The communication stations 3, 6 of the identification ID#3, #6 are located in a range which a signal sent from the communication station 7 reaches, so that the station synchronous signal sent from the communication station 7 is received by the communication stations 3, 6 of the identification ID#3, #6 properly.

Therefore, the communication station 10 which is the central control station cannot receive the station synchronous signal from the communication station 7 so that it cannot recognize an existence of the communication station 7 directly. However, the communication station 10 which is the central control station recognizes the existence of the communication station 7 through information contained in station synchronous signal from the communication station 3 of the identification ID#3 and communication station 6 of the identification ID#6. A communication station which cannot communicate directly with the central control station is called a hidden terminal station.

The communication station 1–6 capable of receiving a signal from the communication station 10 which is the central control station directly determines positions of the transmission slots allocated to itself with reference to a reception timing of the station synchronous signal from the communication station 10. Then, the communication station 7 not capable of receiving a signal from the communication station 10 directly determines a position of the transmission slot allocated to itself with reference to the reception timing of the station synchronous signal which the communication station 7 can receive. That is, a processing for determining the position of the seventh slot allocated to itself is carried out according to positions of the third slot and sixth slot.

Next, a processing for a case where an arbitrary communication station joins this communication network using a slot in the newly joining section of the station synchronous transmission/reception section in a frame will be described.

Assume that a new communication station is requested to join the radio network of the structure shown in FIGS. 1, 2. Then, assume that the new communication station requested to join the network has basically the same structure (structure shown in FIG. 3) as the other communication stations.

A communication station requested to join the network carries out reception processing within a frequency band used by itself to try to receive signals from the other communication stations nearby. If it can receive management information form the central control station, for example, synchronizing with a frame interval set up by the management information, it sends data requesting to newly join to a newly joining slot in the station synchronous transmission/reception section of the frame interval.

Figure 7:
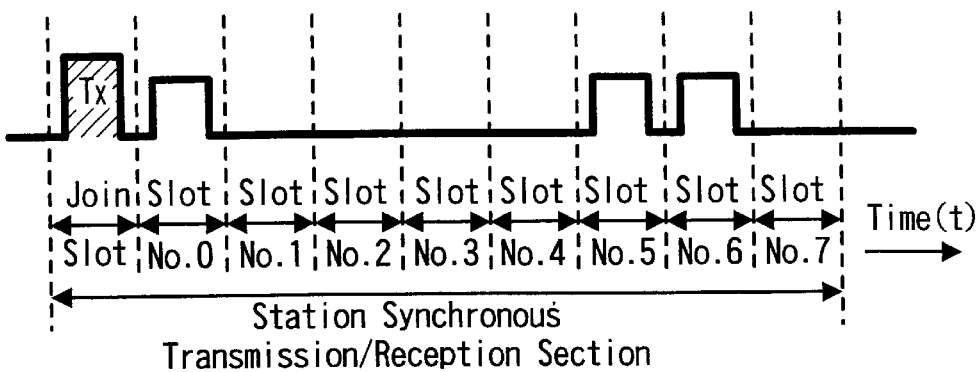
FIG. 7 is an explanatory diagram showing an example of transmission in a newly joining slot according to an embodiment of the present invention.
Figure 9A:
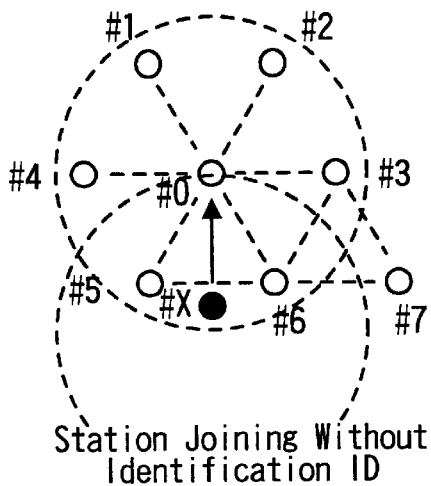
FIG. 9 is an explanatory diagram showing an example of transmission/reception operation at a newly joining station according to an embodiment of the present invention.

Namely, as shown in FIG. 7, transmission Tx for data requesting to join newly is carried out in the newly joining slot of a slot interval prepared at the head portion in the station synchronous transmission/reception section. Because example of FIG. 7 shows a case where a new communication station (identification ID is #X because that ID is not determined) is placed within a range which it is capable of communicating with the central control station of the identification ID#0 directly as shown in FIG. 9A, it dispatches data requesting to newly join through the newly joining slot. Because the communication stations having the identification ID#0, #5, #6 exist around this communication station of the identification ID#X, the communication station of the identification ID#X receives station synchronous signal from those stations through slots corresponding in the station synchronous transmission/reception section subsequent to the newly joining slot. Data requesting to newly join by this newly joining slot may be transmitted only through a frame or continuously through plural frames.

Figure 9B:
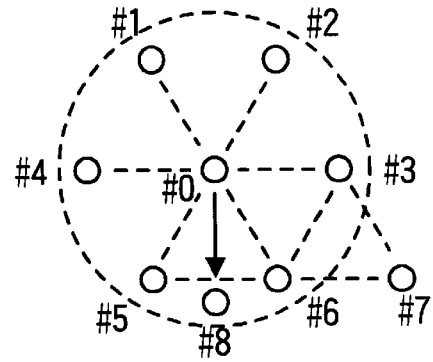

If the central control station recognizes data transmitted through the newly joining slot, the central control station sends information inherent of this radio network (system ID of the radio network system) to a communication station requesting to newly join in the form of data sent through the management information broadcasting section (or data sent through the media information transmission region). At the same time, it attaches an inherent identification data (identification ID of communication station) to the communication station which sent that signal, so that the identification data is memorized in an internal memory 26. The identification data is transmitted through the management information broadcasting section. FIG. 9B shows transmission of certification information from the central control station. If a communication station which requested to newly join receives such data, network ID and inherent identification ID indicated by the received data are memorized in the internal memory 26. The memorized ID is used as its own ID of that communication station. The central control station recognizes that communication station according to the attached identification ID.

Figure 8:
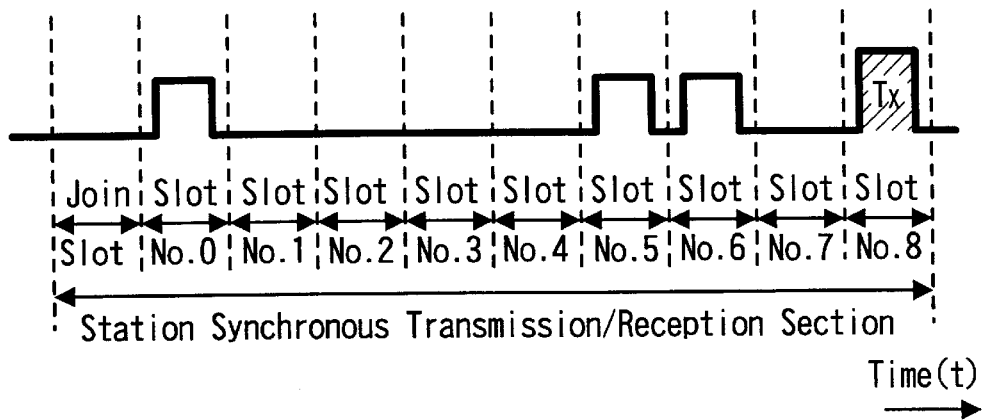
FIG. 8 is an explanatory diagram showing an example of transmission after ID is obtained according to an embodiment of the present invention.

Assume that identification ID#8 is attached to the communication station which requested to join newly. If data for attaching this identification ID is received and set up, transmission Tx of the station synchronous signal is carried out by that communication station at a slot of the identification ID#8 in the station synchronous transmission/reception section as shown in FIG. 8, so that communication station functions as a terminal station in the radio network. Although the slot for the identification ID#8 in the station synchronous transmission/reception section may be prepared in the station synchronous transmission/reception section preliminarily, it is permissible to set up freely by the central control station depending on the number of the terminal stations at that time such that a section after the station synchronous transmission/reception section in a frame is specified as media information transmission region. By setting up in this way, a station synchronous transmission/reception section and media information transmission region of an appropriate term corresponding to the number of the terminal stations are set up so that the media information transmission region can be used most effectively in a frame.

If a communication station which requested to newly join exists in area where it is capable of communicating with the central control station directly, it can join the central control station directly. However, if a communication station capable of communicating with the central control station directly exists out of that area, it may function as a hidden terminal station (terminal station like the communication station 7 shown in FIGS. 1, 2) in the communication network. Hereinafter, a processing for making a request for joining newly and a processing on a side which receives that request, including a processing for the hidden terminal will be described with reference to flow chart.

Figure 10:
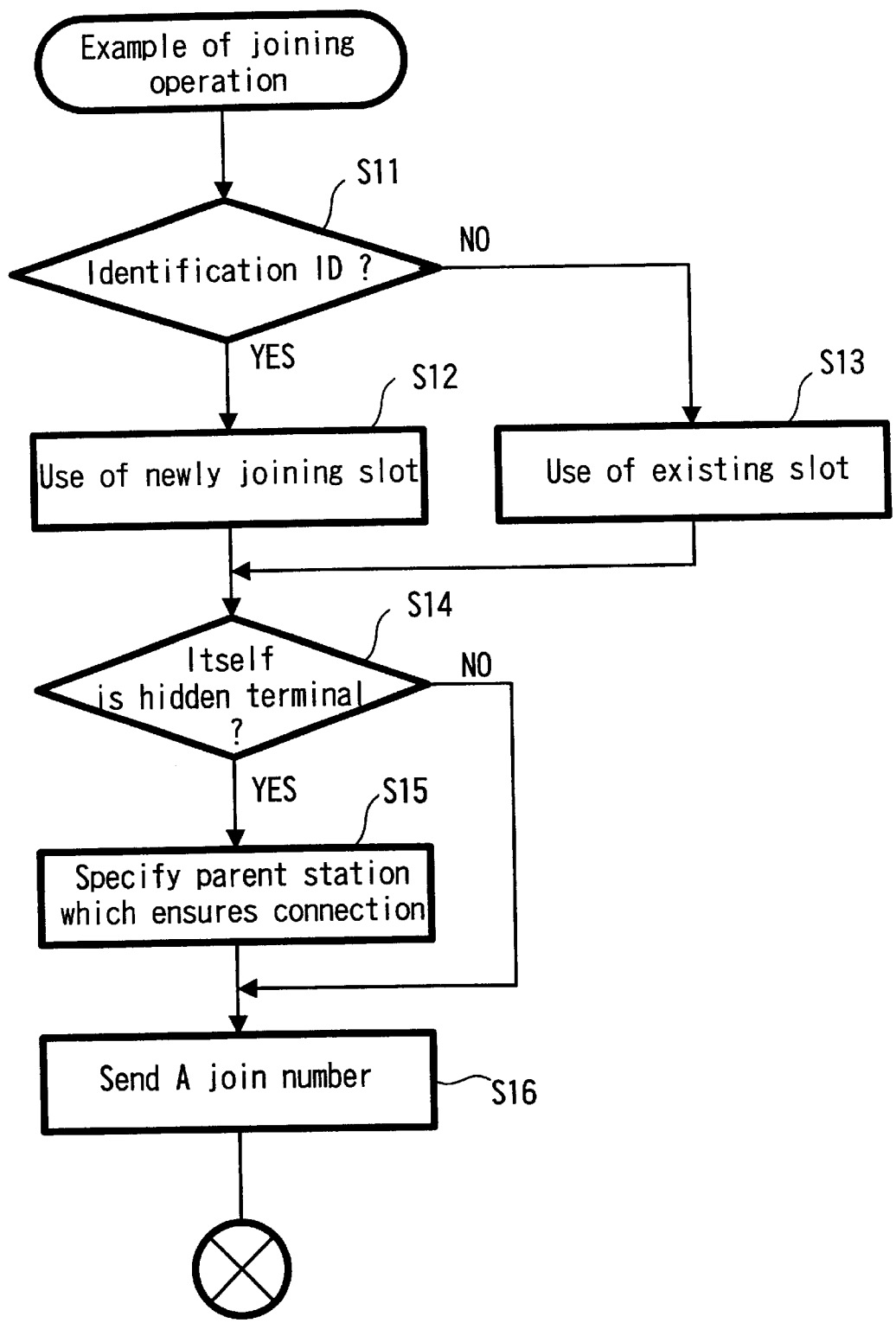
FIG. 10 is a flow chart showing an example of processing at a newly joining station according to an embodiment of the present invention.

A flow chart of FIG. 10 shows a processing at a terminal station which makes a request for joining newly. First, whether or not an its own identification ID is possessed is determined (step S11). If the identification ID is not possessed, it is determined that a slot for joining newly will be used (step S12). If the identification ID has been already given, it is determined that a slot allocated to that given ID in the station synchronous transmission/reception section will be used (step S13).

After processing in the step S12 or S13 is carried out, whether or not the station becomes a hidden terminal station is determined (step S14). This determination is carried out based on determining whether or not management information can be received directly from the central control station. If the management information can be received directly from the central control station, that station is determined to be not the hidden terminal station, but if the management information cannot be received directly form the central control station, it is determined to be the hidden terminal station.

If the station is determined to be the hidden terminal station in step S14, a parent station capable of relaying information from the central control station is specified (step S15). At this time, a communication station capable of relaying it most securely is determined based on a reception condition at that time, received information and the like. At this time, for example, a communication station having the highest reception level is selected or of communication stations capable of receiving station synchronous signals more excellently than a particular level, a communication station having less possibility that it becomes incapable of communicating with others is selected by determining whether or not it is set up such that it cannot move. Information about possibility that each communication station may move may be contained in station synchronous signal from each communication station.

If it is determined that the station is not a hidden terminal station in step S14 and a parent station is specified in step S15, a join signal is transmitted in a state set up by determination up to here (step S16). If the communication station has not yet have the identification ID (when the processing of step S12 is carried out), the signal requesting for a join is transmitted through the newly joining slot. If the communication station has already have the identification ID (when the processing of step S13 is carried out), a slot position corresponding to that identification ID is used. By such a processing, in the communication station intended to join newly, an appropriate processing is carried out corresponding to a condition at that time.

Figure 11:
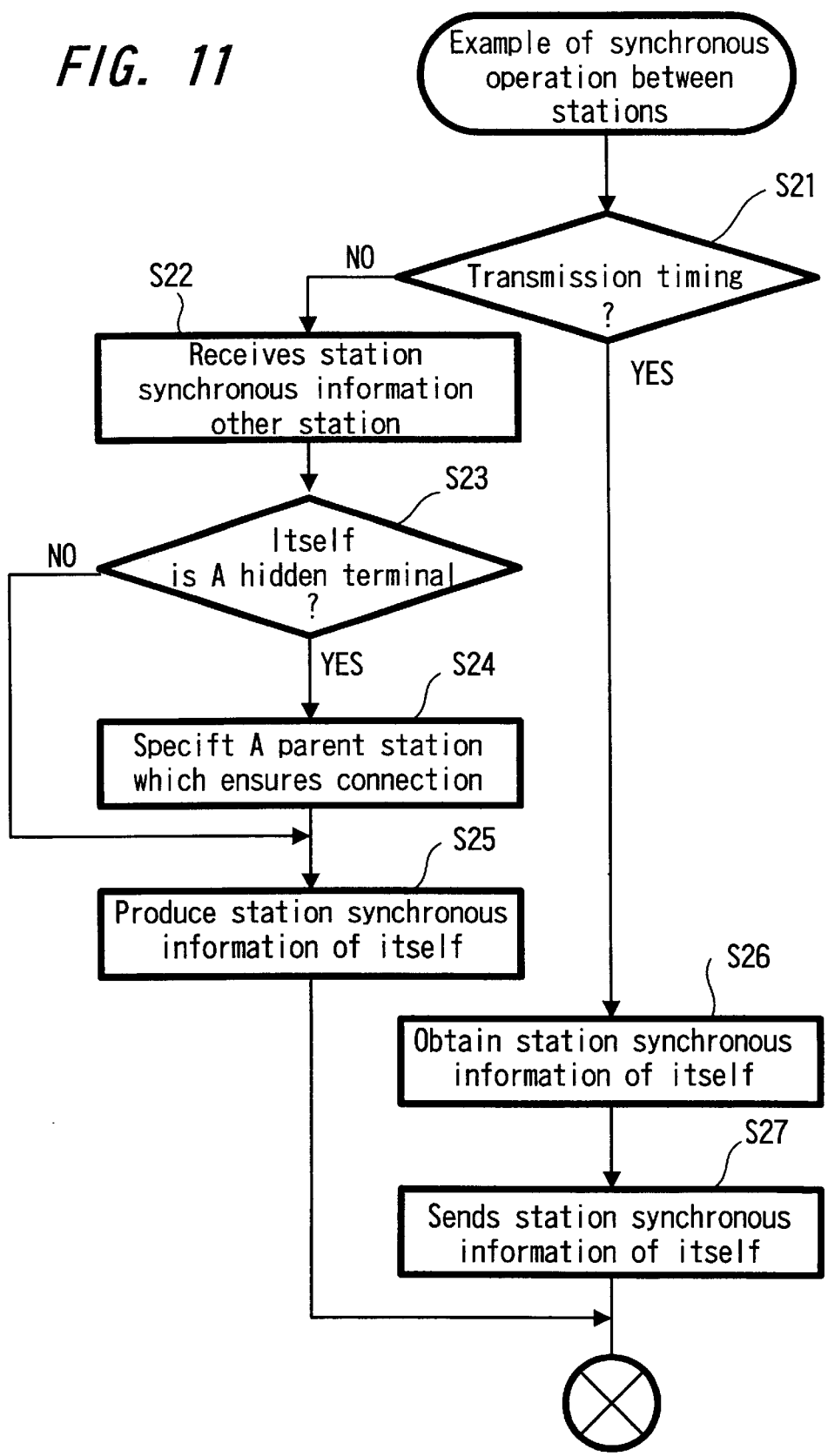
FIG. 11 is a flow chart showing an example of processing in synchronous transmission and reception section between stations according to an embodiment of the present invention.

Next, a processing of each station in the station synchronous transmission/reception section in a communication network having a possibility that there is a hidden terminal station is shown in a flow chart of FIG. 11. First, in the station synchronous transmission/reception section, whether or not transmission timing is a timing for transmitting through a slot allocated to itself is determined (step S21). If it is determined that the transmission timing is not a timing for transmission through the slot allocated to itself, station synchronous information sent from other stations is received (step S22). Then, whether or not itself is a hidden terminal station is determined (step S23) and if itself is a hidden terminal station, a parent station certain to be connected is specified (step S24). Then, station synchronous information of itself is produced based on a reception condition of station synchronous information from other stations and memorized (step S25). If itself is a hidden terminal station, information for specifying the parent station is added to this station synchronous information. If itself is a station specified to be a parent station by a hidden terminal station, information about itself being specified as parent station and information about the hidden terminal station making such a request are added to the station synchronous information.

Then, when it is determined that transmission timing is a timing for transmission by itself in step S21, station synchronous information of itself produced and memorized in step S25 is read out and the station synchronous information of itself is transmitted within the network by radio (step S27).

Figure 12:
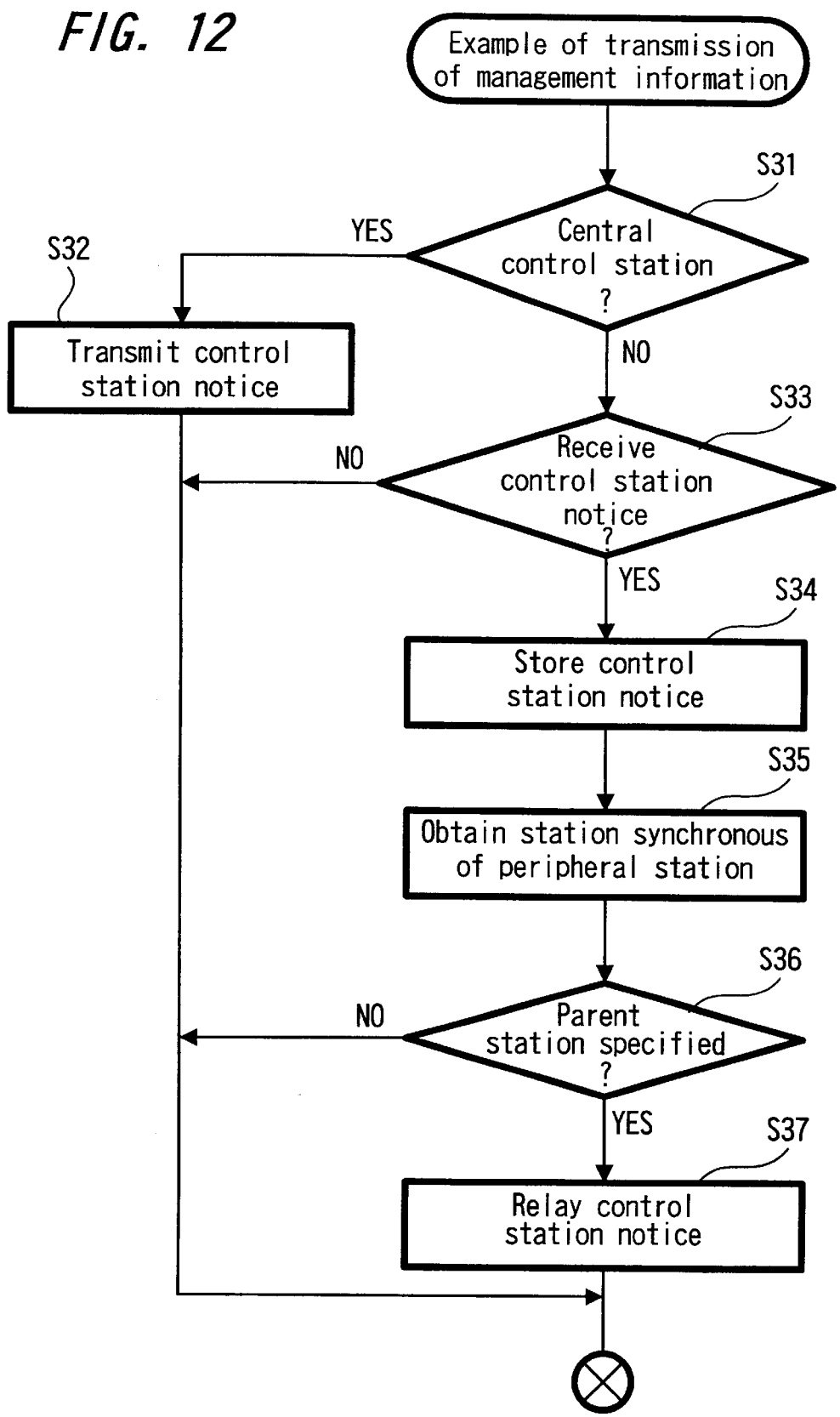
FIG. 12 is a flow chart showing an example of processing in management information broadcasting section according to an embodiment of the present invention.

FIG. 12 shows a flow chart of a processing in the management information broadcasting section of each station in the communication network having a possibility that there is a hidden terminal station. First, whether or not itself is a central control station is determined (step S31). If it is determined that itself is the central control station, control station notice is transmitted in the management information broadcasting section (step S32).

If it is determined that itself is not the central control station in step S31, reception processing is carried out based on the control station notice so as to determine whether or not the control station notice can be received within the management information broadcasting section of each frame interval (step S33). If the control station notice cannot be received in the management information broadcasting section, the processing is terminated. If the control station notice can be received in the management information broadcasting section, a corresponding control station notice is stored (step S34). Then, station synchronous information around the station is obtained (step S35), whether or not there is information for specifying itself to be a parent station by peripheral stations (step S36) and if there is information for specifying itself to be a parent station, the control station notice is transmitted by relay (step S37). If a timing for transmission by relay is specified in the management information broadcasting section preliminarily, this control station notice is transmitted by relay at that timing. Alternatively, the control station notice may be transmitted by relay using the media information transmission region.

Figure 14A:
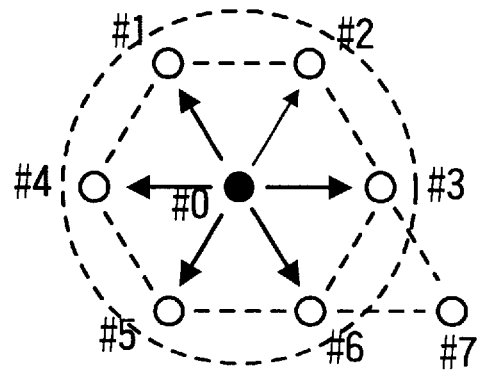
FIG. 14 is an explanatory diagram showing an example of resending of management information according to an embodiment of the present invention.
Figure 14B:
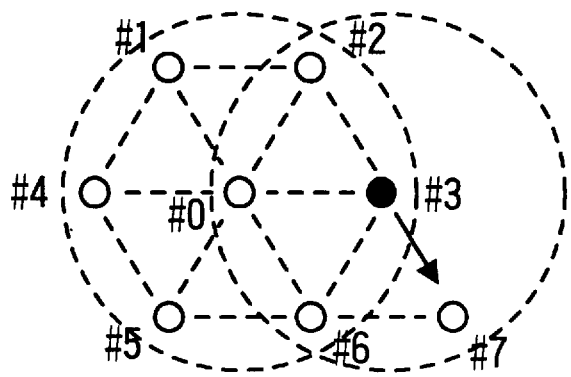

For example, if the communication station 3 is specified as the relay parent station for the hidden terminal station 7 in the network system shown in FIGS. 1, 2, transmission and reception of the control station notice are carried out as shown in FIGS. 13. A–H of FIG. 13 show transmission/reception of the control station notice from the central control station by eight communication stations having the identification ID#0 –#7 in the network and transmission/reception in a section prepared for relay. For the control station notice from the central control station, as shown in A of FIG. 13, transmission Tx is carried out by the central control station of the identification ID#0. Then, as shown in B–G of FIG. 13, the notice is received by respective terminal stations except the hidden terminal station. A of FIG. 14 shows a transmission condition of this control station notice. Then, the terminal station 3 of the identification ID#3 specified as a relay parent station carries out transmission Tx of the control station notice received just before in a section set up for relay notice as shown in D of FIG. 13. B of FIG. 14 shows transmission condition of the control station notice to be notified by relay, so that the hidden terminal station 7 receives the control station notice.

Because a parent station for carrying out relay in such a relay transmission can be specified, any communication station existing in a position in which it is capable of communicating with any terminal station in the network can join that network as a hidden terminal station. By recognizing an existence of the hidden terminal station incapable of receiving information directly from the central control station, a connecting range of the radio network can be widened further without restricting it to a range which can receive a signal from the central control station.

Further, by providing with a station synchronous section allocated to each station in order to grasp an existence of stations constituting the network, the hidden terminal station incapable of receiving a signal directly from the central control station is also allowed to transmit information. As a result, the radio network can be widened excellently.

By providing with a transmission slot dedicated for newly join for a terminal station intended to join the network newly, a terminal station not yet certified by the network can join the network easily.

Further, by setting variably a section for all the terminal stations constituting the network to transmit or receive station synchronous signal in a management information transmission region, the media information transmission region prepared subsequent to that section in a frame can be effectively used to a maximum extent.

Further, by specifying a peripheral station capable of connecting to a hidden terminal station as a parent station, the peripheral station can relay to the hidden terminal station so that the hidden terminal station incapable of receiving a signal from the central control becomes capable of communicating with the central control station. That is, the hidden terminal station incapable of receiving information from the central control station directly can join the network newly through a relay by a terminal station (branch station) capable of communicating with the hidden terminal station directly and receive information common to the network sent from the central control station.

The frame structure and transmission data described in the above embodiment are just an example, and the present invention is not restricted to the above described configuration. Further, the structure of the radio transmission apparatus is not restricted to the above described example, and the above described communication control processing may be applied to communication network comprised of radio transmission apparatus suitable for various radio transmission types.

According to the radio transmission method described above, a communication station which desires to join the radio network newly transmits a predetermined signal in a slot position prepared for newly joining and then, the central control station recognizes that signal so as to execute the processing for making the communication station join the network newly. Only by transmitting the predetermined signal for newly joining, an arbitrary communication station can join the radio network easily.

According to the radio transmission method described above, when the central control station detects a transmission of a predetermined signal through the slot, the central control station sends information inherent of the radio network to a communication station which is a transmission source of the signal and carries out a processing for providing the communication station which is the transmission source of the signal with identification data inherent. As a result, the processing for joining the network can be carried out excellently using the sent information inherent of the network and attached identification data.

According to the radio transmission method described above, the communication station provided with the identification data sends control information at a predetermined slot position in the frame cycle based on an instruction from the central control station. As a result, the central control station can recognize communication state of a newly joining communication station properly, so that control on the newly joining station is carried out by the central control station excellently.

According to the radio transmission method described above, when a specific communication station in radio network except the central control station detects transmission of a predetermined signal in the slot and the central control station cannot detect transmission of the predetermined signal in the slot, the specific communication station acts as a relay station and carries out a processing for making the communication station which is a transmission source of the predetermined signal join the radio network. As a result, a communication station located at a position which it is not capable of communicating with the central control station directly can be made to join the radio network.

According to the radio transmission method described above, when a plurality of the specific communication stations exist, a communication station whose communication with the transmission source of the predetermined signal is secured is selected as the relay station. As a result, when the communication station located at a position in which it is not capable of communicating with the central control station directly is allowed to join the radio network, communication with other stations can be always maintained in an excellent condition.

According to the radio transmission method described above, the communication station set up as the relay station relays management information shared by the radio network to the communication station which is the transmission source of the predetermined signal. As a result, when the communication station located at a position in which it is not capable of communicating with the central control station directly joins the radio network, transmission of management information to that communication station which has joined can be carried out securely.

According to the radio transmission apparatus described above, when reception of a particular signal at the predetermined slot position is recognized, a processing for making a transmission source of that particular signal join the radio network is carried out, so that the newly joining of a communication station is executed by control of this radio transmission apparatus. As a result, only by recognizing a signal set up preliminarily for the newly joining at the predetermined slot position, the processing for making the communication station join newly can be carried out easily.

According to the radio transmission apparatus described above, when the control means recognizes the signal in the slot position, the control means provides the transmission source of the signal with inherent identification data and makes the communication processing means send the identification data. As a result, control on the communication station which has just joined newly can be carried out excellently according to the attached identification data.

According to the radio transmission apparatus described above, the control means so controls as to make the communication processing means send information for specifying a slot position to which the transmission source sends control information. As a result, the slot position for transmitting control information can be recognized in the communication terminal which has just joined, so that the radio network containing that communication terminal is formed favorably.

According to the radio transmission apparatus described above, when the control means recognizes that there is a terminal which desires to join the radio network in discriminating control information received by the communication processing means with the predetermined signal not detected in the slot position, the control means makes the communication processing means send information for instructing to join the radio network and information about relay of information to the terminal to the transmission source of the control information. As a result, the radio terminal which has just joined the network can be controlled and another radio terminal which relays to that radio terminal can be set up, so that a processing for making a hidden terminal join the network can be carried out excellently.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A radio transmission method for carrying out radio transmission in a radio network formed of plural communication stations by a control from a communication station set up as a central control station, the method comprising the steps of:
    specifying a frame cycle of a radio transmission signal by a control signal from said central control station;
    setting a predetermined position in the specified frame cycle as a slot for newly joining said radio network; and
    when a predetermined signal is transmitted through said slot, carrying out a processing for allowing a transmission source of said predetermined signal to join said radio network,
    wherein when said central control station detects transmission of the predetermined signal through said slot, said central control station sends information data inherent of said radio network to the transmission source of the signal.

2. The radio transmission method according to claim 1 wherein the communication station provided with said information data sends control information at a predetermined slot position in said frame cycle based on an instruction from said central control station.

3. A radio transmission method for carrying out radio transmission in a radio network formed of plural communication stations by a control from a communication station set up as a central control station, the method comprising the steps of:
    specifying a frame cycle of a radio transmission signal by a control signal from said central control station;
    setting a predetermined position in the specified frame cycle as a slot for newly joining said radio network; and
    when a predetermined signal is transmitted through said slot, carrying out a processing for allowing a transmission source of said predetermined signal to join said radio network
    wherein when a specific communication station in the radio network, except said central control station, detects transmission of the predetermined signal in said slot and said central control station cannot detect transmission of the predetermined signal in said slot, said specific communication station acts as a relay station and carries out a processing for making the communication station which is a transmission source of said predetermined signal join the radio network.

4. The radio transmission method according to claim 3 wherein when a plurality of said specific communication stations exists, a communication station whose communication with said transmission source of the predetermined signal is secured is selected as the relay station.

5. The radio transmission method according to claim 3 wherein the communication station acting as the relay station relays management information shared by the radio network to the communication station which is the transmission source of the predetermined signal.

6. A radio transmission apparatus for carrying out radio communication with other communication stations in a radio network, comprising:
    communication processing means for transmitting and receiving a radio signal; and
    control means for transmitting a signal for specifying a frame cycle with said communication processing means and, when reception of a specific signal is recognized at a predetermined slot position in the frame cycle, for carrying out a processing for making a transmission source of said specific signal join the radio network,
    wherein when the control means recognizes the specific signal in the predetermined slot position, said control means provides the transmission source of said signal with inherent identification data and controls the communication processing means to send the identification data.

7. A transmission apparatus for carrying out radio communication with other communication stations in a radio network, comprising:
    communication processing means for transmitting and receiving a radio signal; and
    control means for transmitting a signal for specifying a frame cycle with said communication processing means and, when reception of the specific signal is recognized at a predetermined slot position in the frame cycle, for carrying out a processing for making a transmission source of said specific signal join the radio network,
    wherein the control means controls the communication processing to send information for specifying a slot position to which the transmission source sends control information.

8. A radio transmission apparatus for carrying out radio communication with other communication stations in a radio network, comprising:

communication processing means for transmitting and receiving a radio signal; and control means for transmitting a signal for specifying a frame cycle with said communication processing means and, when reception of the specific signal is recognized at a predetermined slot position in the frame cycle, for carrying out a processing for making a transmission source of said specific signal join the radio network, wherein when the control means recognizes that there is a terminal which desires to join the radio network in discriminating control information received by the communication processing means with the predetermined signal not detected in the slot position, said control means controls said communication processing means to send instructing information to join the radio network and information about relay of information to said terminal to the transmission source of said control information.

* * * * *